(12) United States Patent
Sung et al.

(10) Patent No.: US 11,025,552 B2
(45) Date of Patent: Jun. 1, 2021

(54) METHOD AND DEVICE FOR REGULATING PLAYING DELAY AND METHOD AND DEVICE FOR MODIFYING TIME SCALE

(71) Applicants: SAMSUNG ELECTRONICS CO., LTD., Suwon-si (KR); INDUSTRY—UNIVERSITY COOPERATION FOUNDATION HANYANG UNIVERSITY ERICA CAMPUS, Ansan-si (KR)

(72) Inventors: Ho-sang Sung, Yongin-si (KR); Sang-won Kang, Ansan-si (KR); Jong-hyun Kim, Ansan-si (KR); Eun-mi Oh, Seoul (KR); Yaxing Li, Ansan-si (KR); Kyung-hun Jung, Seoul (KR)

(73) Assignees: SAMSUNG ELECTRONICS CO., LTD., Suwon-si (KR); INDUSTRY—UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 149 days.

(21) Appl. No.: 15/757,540

(22) PCT Filed: Sep. 5, 2016

(86) PCT No.: PCT/KR2016/009934
§ 371 (c)(1),
(2) Date: Mar. 5, 2018

(87) PCT Pub. No.: WO2017/039421
PCT Pub. Date: Mar. 9, 2017

(65) Prior Publication Data
US 2018/0248810 A1   Aug. 30, 2018

(30) Foreign Application Priority Data

Sep. 4, 2015   (KR) .................. 10-2015-0125875

(51) Int. Cl.
*G10L 21/04*   (2013.01)
*H04L 12/805*   (2013.01)
(Continued)

(52) U.S. Cl.
CPC ............ *H04L 47/283* (2013.01); *G10L 21/04* (2013.01); *H04L 47/22* (2013.01); *H04L 47/365* (2013.01); *H04L 47/38* (2013.01); *H04L 47/801* (2013.01)

(58) Field of Classification Search
CPC ...... H04L 47/283; H04L 47/22; H04L 47/801
See application file for complete search history.

(56) References Cited

U.S. PATENT DOCUMENTS

| 4,894,823 A * | 1/1990 | Adelmann | .............. H04L 12/08 370/252 |
| 4,920,534 A * | 4/1990 | Adelmann | .............. H04L 12/64 370/474 |

(Continued)

FOREIGN PATENT DOCUMENTS

| KR | 101199448 B1 | 11/2012 |
| KR | 101399604 B1 | 5/2014 |

(Continued)

OTHER PUBLICATIONS

Verhelst, Werner, and Marc Roelands. "An overlap-add technique based on waveform similarity (WSOLA) for high quality time-scale modification of speech." IEEE International Conference on Acoustics, Speech, and Signal Processing. vol. 2, p. II-554-II-557. (Year: 1993).*

(Continued)

*Primary Examiner* — Daniel C Washburn
*Assistant Examiner* — Oluwadamilola M Ogunbiyi
(74) *Attorney, Agent, or Firm* — Sughrue Mion, PLLC

(57) ABSTRACT

A playout delay adjustment method includes: adjusting a playout delay surplus based on a difference value between a first playout delay obtained in a first scheme and a second playout delay obtained in a second scheme and determining an adaptation type of a current frame according to whether a previous frame is an active frame; and when the determined adaptation type is signal-based adaptation, performing time scale modification (TSM) according to an adaptation scheme determined according to a comparison result between the first playout delay and the second playout delay and a comparison result between a target delay and the first playout delay.

6 Claims, 11 Drawing Sheets

(51) Int. Cl.
*H04L 12/811* (2013.01)
*H04L 12/815* (2013.01)
*H04L 12/841* (2013.01)
*H04L 12/927* (2013.01)

(56) References Cited

U.S. PATENT DOCUMENTS

| | | | | |
|---|---|---|---|---|
| 6,484,137 | B1* | 11/2002 | Taniguchi | G10L 21/04 704/211 |
| 7,065,485 | B1* | 6/2006 | Chong-White | G10L 21/04 704/200.1 |
| 7,233,897 | B2* | 6/2007 | Kapilow | G10L 19/005 341/94 |
| 7,849,475 | B2* | 12/2010 | Covell | G11B 15/087 725/22 |
| 8,355,907 | B2* | 1/2013 | Kapoor | G10L 19/005 704/221 |
| 8,548,804 | B2* | 10/2013 | Barrett | G10L 25/69 704/236 |
| 8,843,379 | B2 | 9/2014 | Choi et al. | |
| 2002/0133334 | A1* | 9/2002 | Coorman | G10L 21/04 704/211 |
| 2004/0131192 | A1* | 7/2004 | Metcalf | H04S 7/30 381/1 |
| 2005/0055204 | A1* | 3/2005 | Florencio | G10L 21/04 704/233 |
| 2005/0071153 | A1* | 3/2005 | Tammi | G10L 19/08 704/219 |
| 2005/0273321 | A1 | 12/2005 | Choi | |
| 2006/0100885 | A1* | 5/2006 | Oh | G10L 21/04 704/503 |
| 2006/0288846 | A1* | 12/2006 | Logan | A63B 71/0686 84/612 |
| 2007/0211704 | A1* | 9/2007 | Lin | G10L 19/167 370/356 |
| 2007/0253337 | A1* | 11/2007 | Morinaga | H04L 12/6418 370/249 |
| 2008/0069127 | A1* | 3/2008 | Khalil | H04J 3/0632 370/412 |
| 2008/0114606 | A1* | 5/2008 | Ojala | G10L 19/008 704/500 |
| 2008/0130511 | A1* | 6/2008 | Koo | G10L 19/24 370/252 |
| 2010/0169105 | A1* | 7/2010 | Shim | G10L 21/04 704/503 |
| 2011/0257964 | A1* | 10/2011 | Rathonyi | H04J 3/0697 704/201 |
| 2012/0250678 | A1* | 10/2012 | Sabella | H04L 47/10 370/352 |
| 2014/0072000 | A1 | 3/2014 | Shiva et al. | |
| 2014/0222430 | A1* | 8/2014 | Rao | G10L 15/04 704/254 |
| 2014/0334484 | A1* | 11/2014 | Klimker | H04L 65/604 370/352 |
| 2015/0319212 | A1* | 11/2015 | Mani | H04L 47/34 370/352 |
| 2015/0350099 | A1* | 12/2015 | Sun | H04L 65/80 370/412 |
| 2016/0180857 | A1* | 6/2016 | Reuschl | G10L 19/022 704/503 |

FOREIGN PATENT DOCUMENTS

| | | |
|---|---|---|
| WO | 2005/045830 A1 | 5/2005 |
| WO | 2014202672 A2 | 12/2014 |

OTHER PUBLICATIONS

Steinbach, Eckehard, et al. "Adaptive media playout." Multimedia over IP and Wireless Networks. Academic Press, 2007. 527-556. (Year: 2007).*
Communication dated Jul. 17, 2019 issued by the European Intellectual Property Office in counterpart European Application No. 16 842 387.9.
Itu-t "The E-Model: a Computational Model for Use in Transmission Planning", G. 107, Aug. 14, 2015, (32 pages total).
ETSI "Universal Mobile Telecommunications Systems (UMTS); LTE; EVS Codec Jitter Buffer Management" 3GPP TS 26.448 version 12.0.0 Release 12, Oct. 2014, (27 pages total).
International Search Report (PCT/ISA/210), issued by International Searching Authority in corresponding International Application No. PCT/KR2016/009934, dated Dec. 19, 2016.
Written Opinion (PCT/ISA/237), issued by the International Searching Authority in corresponding International Application No. PCT/KR2016/009934, dated Dec. 19, 2016.
Communication dated Aug. 21, 2018 issued by the European Patent Office in European Counterpart Application No. 16842387.9.
"3rd Generation Partnership Project; Technical Specification Group Services and System Aspects; Codec for Enhanced Voice Services EVS Codec Jitter Buffer Management (Release 12)", 3GPP TS 26.448 V0.1.0, Aug. 1, 2014, pp. 1-19.

* cited by examiner

METHOD AND DEVICE FOR REGULATING PLAYING DELAY AND METHOD AND DEVICE FOR MODIFYING TIME SCALE

TECHNICAL FIELD

The present disclosure relates to jitter buffer management and, more specifically, to a method and apparatus for adjusting a playout delay without an excessive increase in complexity and a time scale modification method and apparatus.

BACKGROUND ART

A packet network-based communication system is hardly reliable and is unstable since there occurs a case in which a packet is transmitted with a random delay or is lost. To compensate for this problem, an active error adjustment function of requesting a retransmission when a transmitted packed is delayed by an allowed value or more or is lost is provided, but an additional delay occurs due to this function, and thus it is difficult that this function is applied to a call service supporting a real-time conversation.

Therefore, many schemes of enabling a vocoder to continuously output a voice signal by constantly maintaining a flow of a received packet while reducing a packet delay and/or a packet loss have been developed. The most efficient scheme in an environment in which a network characteristic varies along time among these schemes may be a jitter buffer management (hereinafter, referred to as JBM) scheme capable of adjusting a playout delay in not only a mute interval but also a voice interval by using time scale modification (hereinafter, referred to as TSM) processing. The necessity of reducing a playout delay or correcting a packet error to meet various network circumstances is the significant rise in the JBM scheme.

DESCRIPTION OF EMBODIMENTS

Technical Problem

Provided are a method and apparatus for adjusting a playout delay by using a jitter buffer or a time scale modification (TSM) module without an excessive increase in complexity and a time scale modification method and apparatus.

Solution to Problem

According to an aspect of the present disclosure, a playout delay adjustment method includes: adjusting a playout delay surplus based on a difference value between a first playout delay obtained in a first scheme and a second playout delay obtained in a second scheme, and determining an adaptation type of a current frame according to whether a previous frame is an active frame; and when the determined adaptation type is signal-based adaptation, performing time scale modification (TSM) according to an adaptation scheme determined according to a comparison result between the first playout delay and the second playout delay and a comparison result between a target delay and the first playout delay.

The first scheme may be based on an enhanced voice service (EVS) codec, and the second scheme may be based on an E-model.

The performing of the TSM may include: when a difference between the first playout delay and the second playout delay is greater than a threshold, determining time scale shrinking as the adaptation scheme; and when the difference between the first playout delay and the second playout delay is less than the threshold, determining time scale stretching or shrinking as the adaptation scheme based on a difference between the target delay and the first playout delay.

According to an aspect of the present disclosure, a time scale modification (TSM) method includes: determining a reduced search range for a current frame based on an optimal location of a past frame; determining whether to search for a range remaining by excluding the reduced search range; estimating similarity with respect to the reduced search range and the remaining range and searching for optimal locations having a maximum similarity; determining, as a final optimal location, one of the optimal location retrieved in the reduced search range and the optimal location retrieved in the remaining range; and performing time scale shrinking or stretching based on the final optimal location.

According to an aspect of the present disclosure, a playout delay adjustment apparatus includes: an adaptation control unit configured to adjust a playout delay surplus based on a difference value between a first playout delay obtained in a first scheme and a second playout delay obtained in a second scheme and determine an adaptation type of a current frame according to whether a previous frame is an active frame; a jitter buffer unit configured to store frames to be decoded, and to perform adaptation on the stored frames when the determined adaptation type is frame-based adaptation; a decoding unit configured decode a frame provided from the jitter buffer; and a time scale modification (TSM) application unit configured to perform adaptation on the decoded frame when the determined adaptation type is time-based adaptation.

The TSM application unit may be further configured to determine time scale shrinking as an adaptation scheme when a difference between the first playout delay and the second playout delay is greater than a threshold and to determine time scale stretching or shrinking as the adaptation scheme based on a difference between a target delay and the first playout delay when the difference between the first playout delay and the second playout delay is less than the threshold.

According to an aspect of the present disclosure, a time scale modification (TSM) apparatus includes a processor configured to determine a reduced search range for a current frame based on an optimal location of a past frame, determine whether to search for a range remaining by excluding the reduced search range, estimate similarity with respect to the reduced search range and the remaining range, search for optimal locations having a maximum similarity, determine, as a final optimal location, one of the optimal location retrieved in the reduced search range and the optimal location retrieved in the remaining range, and perform time scale shrinking or stretching based on the final optimal location.

Advantageous Effects of Disclosure

Playout delay reduction or packet error correction may be performed to meet various network circumstances without an excessive increase in complexity.

MODE OF DISCLOSURE

The present disclosure may allow various kinds of change or modification and various changes in form, and specific embodiments will be illustrated in drawings and described in detail in the detailed description. However, it should be understood that the specific embodiments do not limit the present disclosure to a specific disclosing form but include every modified, equivalent, or replaced one within the technical spirit and technical scope of the present disclosure. In the description of the embodiments, when it is determined that a specific description of relevant well-known features may obscure the essentials of the present disclosure, a detailed description thereof is omitted.

Although terms, such as 'first' and 'second', can be used to describe various elements, the elements cannot be limited by the terms. The terms can be used to classify a certain element from another element.

The terms used in this specification are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the specification should be understood not as simple names but based on the meaning of the terms and the overall description.

An expression in the singular includes an expression in the plural unless they are clearly different from each other in context. In the present disclosure, it should be understood that terms, such as 'include' and 'have', are used to indicate the existence of an implemented feature, number, step, operation, element, part, or a combination thereof without excluding in advance the possibility of the existence or addition of one or more other features, numbers, steps, operations, elements, parts, or combinations thereof.

Hereinafter, the embodiments will be described in detail with reference to the accompanying drawings.

Figure 1:
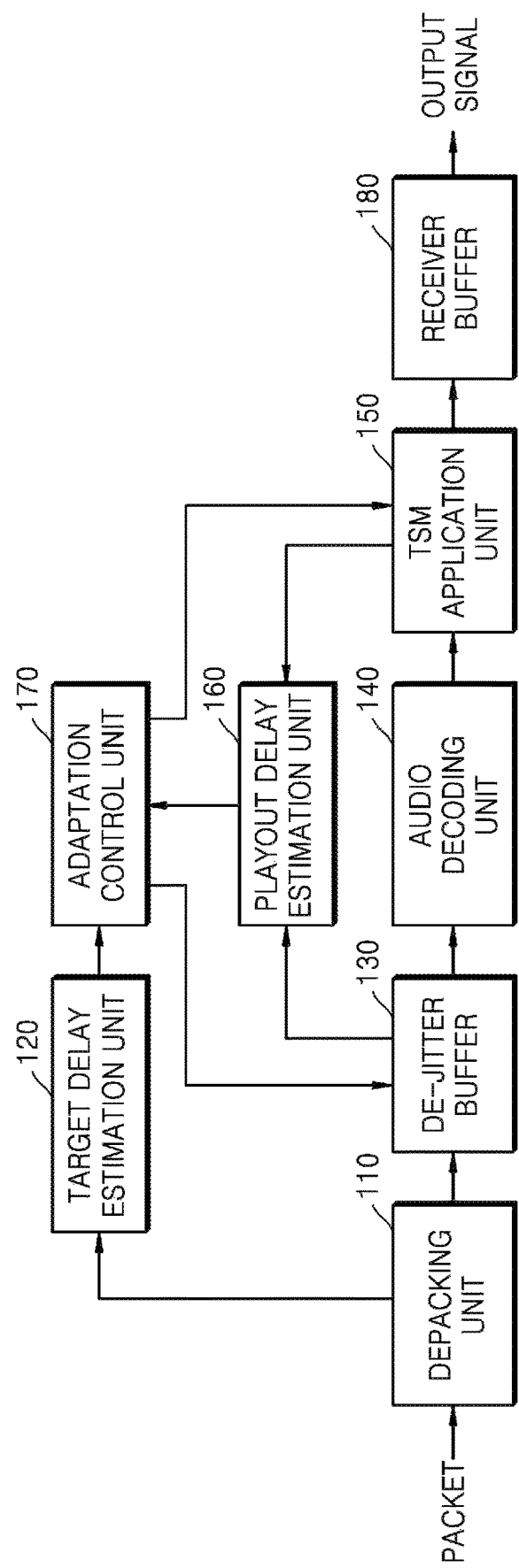
FIG. 1 is a block diagram of a playout delay adjustment apparatus according to an embodiment.

FIG. 1 is a block diagram of a playout delay adjustment apparatus according to an embodiment.

The apparatus shown in FIG. 1 may include a depacking unit 110, a target delay estimation unit 120, a de-jitter buffer 130, an audio decoding unit 140, a time scale modification (TSM) application unit 150, a playout delay estimation unit 160, an adaptation control unit 170, and a receiver buffer 180.

Referring to FIG. 1, the depacking unit 110 may analyze a packet stream received through a transmission channel or a modem and extract frames embedded in a packet and metadata for estimating network jitter. The extracted frames may be provided to the de-jitter buffer 130. For example, the packet may be a real-time transport protocol (RTP) packet having an RTP payload format. For example, the frames may be frames encoded by an enhanced voice service (EVS) codec. When a decoding apparatus receives a bitstream, the depacking unit 110 may be optionally included. The depacking unit 110 may calculate and allocate a media timestamp for each frame existing in a received RTP packet. The RTP packet may include an RTP header and an RTP payload. In the RTP header, a data field related to the de-jitter buffer 130 may include an RTP timestamp and an RTP sequence number. According to an embodiment, a data structure of each frame extracted by the depacking unit 110 may include frame payload data including a payload size, an arrival timestamp of an RTP packet including a corresponding frame, a media timestamp of an RTP time scale unit derived from an RTP timestamp of the packet, an RTP time scale defined in an RTP payload format specification, a silence insertion descriptor (SID) flag, and a partial copy flag. To operate the de-jitter buffer 130 independently from an audio codec, the SID flag needs to be provided to the de-jitter buffer 130. For example, for EVS, adaptive multi-rate (AMR), and AMR-wideband (AMR-WB) codecs, the SID flag may be determined depending on a size of the frame payload data.

The target delay estimation unit 120 may estimate arrival jitter and a target delay of a packet. The target delay estimation unit 120 may estimate network jitter to control a palyout delay of the de-jitter buffer 130. The target delay may be obtained by combining a long-term jitter estimation value and a short-term jitter estimation value.

Hereinafter, a method of obtaining the long-term jitter estimation value, according to an embodiment, will be described.

For each frame received as an RTP packet through a network, an entry is added to an array such as a first-in first-out (FIFO) queue, wherein the entry includes a delay $d_i$, an offset $o_i$, and an RTP timestamp $t_i$. In a specific circumstance, a time span stored in the FIFO queue may differ from a number of stored entries. Due to this, a window size of the FIFO queue may be limited. For example, when 50 packets are received for one second, the FIFO queue may include total 500 entries corresponding to 10 seconds, and a time span corresponding to an RTP timestamp difference between the latest frame and the oldest frame may be 10 seconds. When it is needed to store more entries, the oldest entry is removed. Herein, the array may include valid entries. Under these conditions, the long-term jitter estimation value $j_i$ may be obtained using Equation 1 below.

$$j_i = \max(d_{i-500}, \ldots, d_i) - \min(d_{i-500}, \ldots, d_i) \qquad (1)$$

Next, a method of obtaining the short-term jitter estimation value, according to an embodiment, will be described. Basically, this method is similar to the method of the long-term jitter estimation value.

A window size of a first array is limited to maximum 50 entries and a time span of maximum one second. As a result, the resulting first temporary jitter value $k_i$ is calculated as the difference between a 94% percentile delay value $d_{p94}$ currently stored in the first array and the minimum delay value of the first array using Equation 2 below.

$$k_i = d_{p94} - \min(d_{i-50}, \ldots, d_i) \qquad (2)$$

Next, a second temporary jitter value $l_i$ may be generated by compensating different offsets to long-term FIFO and short-term FIFO. The second temporary jitter value $l_i$ may be obtained by adding a difference between a minimum offset value stored in the first array and a minimum offset value stored in the long-term FIFO to the first temporary jitter value $k_i$ by Equation 3 below.

$$l_i = k_i + \min(o_{i-50}, \ldots, o_i) - \min(o_{i-500}, \ldots, o_i) \quad (3)$$

The second temporary jitter value $l_i$ is added to a second array having a maximum window size of 200 entries and a maximum time span of four seconds.

Finally, a maximum jitter value of the second array may be rounded as an integer multiple of a frame size, and as a result, the short-term jitter estimation value $m_i$ may be obtained using Equation 4 below.

$$m_i = \lceil \max(l_{i-200}, \ldots, l_i)/20 \text{ ms}\rceil * 20 \text{ ms} \quad (4)$$

Meanwhile, playout may be adapted such that a difference between a playout delay and a target delay is minimized. A packet transmission delay in a network may include a sum of a fixed component and a variable component. The fixed component may include inevitable factors such as a propagation time through a physical medium and a minimum processing time, and the variable component may occur by, for example, network jitter due to scheduling. Since the de-jitter buffer 130 does not expect clocks synchronized between a transmitter and a receiver, the fixed delay component cannot be estimated only with information obtainable from a received RTP packet, and thus the fixed delay component may be ignored.

Meanwhile, to estimate the variable delay component, two basic values, i.e., the delay $d_i$ and the offset $o_i$ may be obtained using an arrival timestamp $r_i$ and a media timestamp $t_i$. The delay component estimation may be performed for each frame. Herein i denotes a current frame, and i−1 denotes a previous frame. A delay $d_0$ of a frame received for the first time in a session may be 0. The delay $d_i$ of each frame may be obtained using Equation 5 below.

$$d_i = (r_i - r_{i-1}) - (t_i - t_{i-1}) + d_{i-1} \quad (5)$$

The delay $d_i$ may be calculated in a unit of millisecond. A sliding window may store the offset $o_i$ and the delay $d_i$ in Equation 6 below for a received frame.

$$o_i = r_i - t_i \quad (6)$$

A stored difference between a minimum delay and a maximum delay may be used as a variable jitter component, i.e., an estimation value of network jitter.

Both the target delay and the playout delay may be calculated based on a stored minimum offset, i.e., an offset calculated with respect to a frame received with the least transmission delay in comparison to all frames currently included in the sliding window.

The target delay estimation unit 120 may estimate different target delays according to frame types and locations. For example, different target delays may be estimated for an active frame, an inactive frame, and a first frame after inactive.

To estimate a target delay for an active frame, a minimum target delay, i.e., a lower threshold $u_i$, and a maximum target delay, i.e., an upper threshold $v_i$, by combining a short-term jitter estimation value and a long-term jitter estimation value. The lower threshold $u_i$ and the upper threshold $v_i$ may be obtained using Equation 7 below.

$$v_i = m_i + 60 \text{ ms} + g$$

$$u_i = \min(j_i + 20 \text{ ms} + g + h, v_i) \quad (7)$$

Herein, g denotes a surplus redundant frame delay and may be set to 0, and h denotes a reserved delay may be set to 15. These variables g and h may be modified according to embodiments.

For an active frame, when a playout delay exceeds each threshold, signal-based adaptation may be performed.

Meanwhile, for an inactive frame, to increase or decrease a playout delay such that the playout delay follows a target delay $w_i$ for the inactive frame, frame-based adaptation may be performed by inserting or removing a NO_DATA frame. The target delay $w_i$ may be obtained from a minimum value of a long-term jitter estimation value and a short-term jitter estimation value by Equation 8 below.

$$w_i = \min(j_i + h, m_i) \quad (8)$$

Meanwhile, for a first active frame after an inactive frame, to increase a playout delay such that the playout delay matches a target delay $z_i$ for the first active frame frame, frame-based adaptation may be performed by inserting a NO_DATA frame. The target delay $z_i$ may be obtained from a mean of the lower threshold $u_i$ and the upper threshold $v_i$ of an active frame by Equation 9 below.

$$z_i = (u_i + v_i + h/4)/2 \quad (9)$$

The de-jitter buffer 130 may store the frames extracted by the depacking unit 110, for decoding and playout. Each statistical value may be updated in correspondence to the stored frames. The frames stored in the de-jitter buffer 130 may not be directly provided to the audio decoding unit 140, and frame-based adaptation may be performed to smooth network jitter instead. Examples of the frame-based adaptation may include inserting a concealed frame, removing a frame stored in the de-jitter buffer 130, and adding or removing a comfort noise frame. In detail, when the existence of a lost frame is signaled to the audio decoding unit 140, a concealed frame for the lost frame is generated and provided to the de-jitter buffer 130. When the concealed frame is provided to the de-jitter buffer 130, a playout delay may increase, and thus when the playout delay after playout of the last frame is greater than a target delay, a first frame to be decoded after inserting the concealed frame may be removed. In a specific circumstance, for example, in a discontinuous transmission (DTX) state, a playout delay may increase by inserting a frame including comfort noise. For frame-based adaptation, a first active frame after DTX may be decoded after decoding a comfort noise frame. When adaptation is performed by inserting a comfort noise frame, i.e., a NO_DATA frame, between two SID frames or between one SID frame and a first active frame, signal distortion may be minimized. Meanwhile, a comfort noise frame may be removed by omitting decoding of a NO_DATA frame. In addition, a comfort noise frame before a first active frame after DTX may be removed to control a playout delay between SID frames.

An RTP packet may be transmitted in a network with network jitter, i.e., a time-variable delay, and may be reordered, lost, or copied. The de-jitter buffer 130 may store frames included in an RTP packet received from a network and provide the frames to the audio decoding unit 150 in an accurate order. The de-jitter buffer 130 may have a ring-buffer structure having a fixed capacity. To prevent an excessive delay and memory use in a specific environment, the de-jitter buffer 130 may have a capacity allocated to store three-second active audio data, i.e., up to 150 entries, when a frame length after initialization is 20 ms. In a case of overflow, the oldest frame may be removed from the de-jitter buffer 130. A depth of the de-jitter buffer 130 is dynamic and may be controlled by the adaptation control unit 170.

The audio decoding unit 140 may decode frames provided from the de-jitter buffer 130 to pulse-code modulation (PCM) data. For example, an EVS codec may be used for the decoding.

The TSM application unit 150 may perform signal-based adaptation to change a playout delay for a signal decoded by the audio decoding unit 140, i.e., the PCM data. The TSM application unit 150 may perform TSM for time shrinking or time stretching of the signal decoded by the audio decoding unit 140, in response to an adaptation mode determined by the adaptation control unit 170. The TSM application unit 150 may generate additional samples to increase a playout delay or may remove samples from the signal decoded by the audio decoding unit 140 to decrease a playout delay.

The playout delay estimation unit 160 may generate information regarding a current playout delay due to the de-jitter buffer 130. A playout delay may be calculated every time the audio decoding unit 140 is activated regardless of whether the audio decoding unit 140 decodes a received frame, conceals a lost frame, or generates comfort noise for an inactive frame.

The adaptation control unit 170 may select a frame-based adaptation type or a time-based adaptation type based on a target delay and a playout delay obtained according to a state and location of a frame and determine an adaptation mode in each adaptation type.

The receiver buffer 180 may temporarily store PCM data provided from the TSM application unit 150 and output the PCM data in a fixed frame size. The receiver buffer 180 may include a FIFO queue for PCM data. When signal-based adaptation is performed, the TSM application unit 150 does not generate a frame of a fixed length, for example, 20 ms, and thus the receiver buffer 180 is used to output PCM data of a fixed length.

Figure 2:
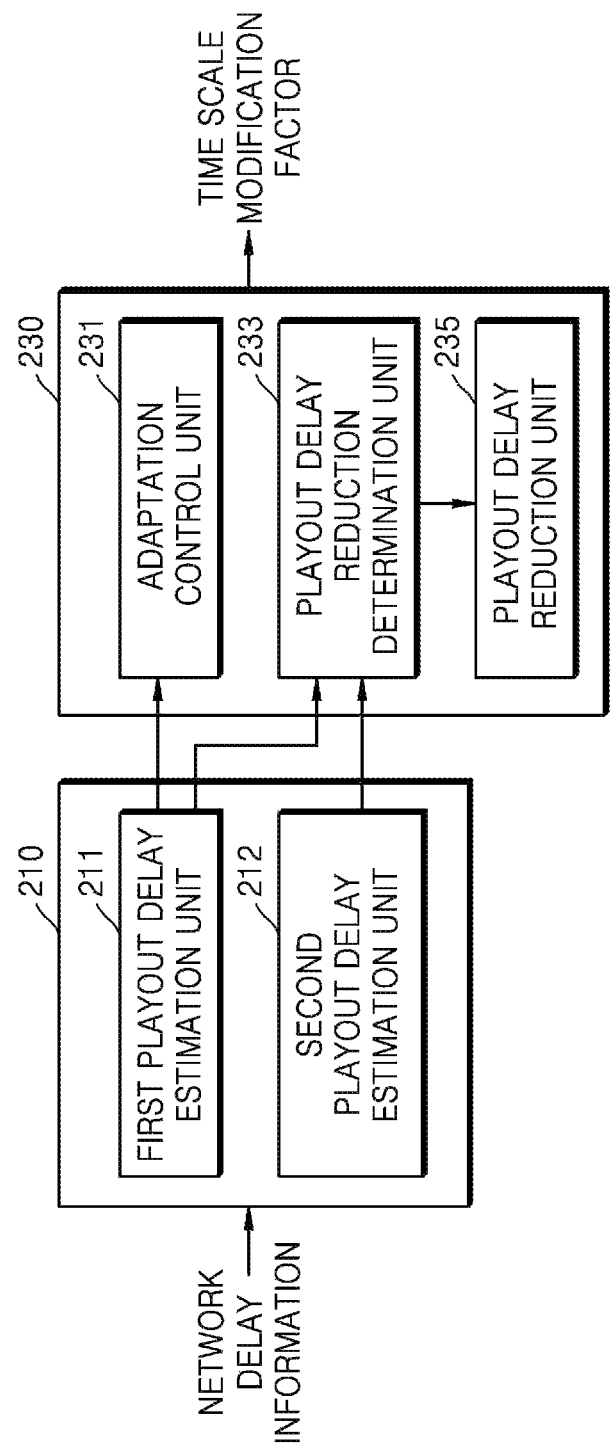
FIG. 2 is a block diagram of a playout delay adjustment apparatus according to another embodiment.

FIG. 2 is a block diagram of a playout delay adjustment apparatus according to an embodiment. According to an embodiment, the playout delay adjustment apparatus may include a playout delay estimation module 210 and an adaptation control module 230. The playout delay estimation module 210 and the adaptation control module 230 may correspond to the playout delay estimation unit 160 and the adaptation control unit 170 in FIG. 1

In FIG. 2, the playout delay estimation module 210 may include a first playout delay estimation unit 211 and a second playout delay estimation unit 213, and the adaptation control module 230 may include an adaptation control unit 231, a playout delay reduction determination unit 233 and a playout delay reduction unit 235.

Referring to FIG. 2, the first playout delay estimation unit 211 may generate information regarding a current playout delay due to the de-jitter buffer 130. A previous playout delay $p_{k-1}$ may indicate a buffering delay between a previous playout time k−1 at which a frame was played and a time at which the frame could be received. The previous playout delay $p_{k-1}$ may be obtained using Equation 10 below.

$$p_{k-1} = q_{k-1} - \min(o_{i-500}, \ldots, o_i) + b_k \tag{10}$$

Herein, $b_k$ denotes an interval of samples buffered in the receiver buffer 180 at a playout time k, and min $(o_{i-500}, \ldots, o_i)$ denotes a minim offset stored in a long-term FIFO regardless of which frame is currently being played. A previous playout offset $q_{k-1}$ may be recalculated by using a current system time $s_{k-1}$ and an RTP timestamp $t_{k-1}$ of a frame output from the de-jitter buffer 130 every time a received frame is output from the de-jitter buffer 130. The previous playout offset $q_{k-1}$ may be obtained using Equation 11 below.

$$q_{k-1} = s_{k-1} - t_{k-1} \tag{11}$$

Since the previous playout offset $q_{k-1}$ uses an RTP timestamp, the previous playout offset $q_{k-1}$ cannot be calculated for a concealed frame or comfort noise, and in this case, an estimation value may be used. It may be estimated that a current playout offset $q_k$ may be the same as the previous playout offset $q_{k-1}$. The current playout offset $q_k$ may be updated every time frame-based adaptation is performed, wherein a frame interval to be inserted is added to the current playout offset $q_k$, and a frame interval to be removed is deducted from the current playout offset $q_k$.

The second playout delay estimation unit 213 may estimate a playout delay based on E-model defined by International Telecommunication Union-Telecommunication Standardization Sector (ITU-T). That is, a playout delay may be estimated such that a sound quality evaluation value, i.e., a transmission rating factor R, used in the E-model, which may be represented by Equation 12, is maximized.

$$R = R_0 - I_s - I_d - I_{e,eff} + A \tag{12}$$

Herein, $R_0$ denotes a basic signal to noise ratio, $I_s$ denotes a simultaneous impairment factor, $I_d$ denotes a delay impairment factor, $I_{e,eff}$ denotes an equipment impairment factor, and A denotes an advantage factor. That is, $I_d$ and $I_{e,eff}$ are sound quality deterioration factors occurring according to a transmission delay and loss, respectively. Therefore, a playout delay may be estimated to minimize $I_d$ and $I_{e,eff}$.

$I_{e-eff,WB}$, which denotes an equipment impairment factor for a wideband signal, may be defined by Equation 13 below.

$$I_{e-eff,WB} = I_{e,WB} + (95 - I_{e,WB}) \cdot \frac{P_{pl}}{\frac{P_{pl}}{\text{Burst}} + B_{pl}} \tag{13}$$

Herein, $I_{e,WB}$ denotes a codec impairment factor considered when there is no packet loss, $P_{pl}$ denotes a packet loss rate, Burst denotes a burst rate, and $B_{pl}$ denotes a considered codec packet loss robustness factor. That is, $I_{e,WB}$ and $B_{pl}$ are factors defined according to a codec.

The packet loss rate $P_{pl}$ may be defined by Equation 14 below.

$$P_{pl} = (1 - F(d)) \tag{14}$$

Herein, F(d) denotes a packet delay cumulative distribution function.

Meanwhile, $I_d^{WB}$, which denotes a delay impairment factor for a wideband signal, may be defined by Equation 15 below.

$$I_d^{WB} = 0.0103d + 0.1006(d-168)H(d-168) \tag{15}$$

Herein, d denotes an absolute end-to-end delay in a packet connection and may be obtained by a sum of an encoding delay, a packetized delay, a decoding delay, and a network delay. Meanwhile, H(x) has a value of 0 when x<0 and 1 when x≥0.

According to an embodiment, based on Equation 16 below, a transmission delay value causing a sum $I_m$ of $I_d$ and $I_{e,eff}$ which are sound quality deterioration factors to be minimized to maximize the sound quality evaluation value R may be found.

$$d^i_{Emodel}: l_m(d^i_{Emodel}) = \min_{d_{min} \le d \le d_{max}} l_m(d) \quad (16)$$

Herein, $d_{min}$ may be set to 0, and $d_{max}$ may be set to 450, but the present embodiment is not limited thereto.

The adaptation control unit 231 may compare a playout delay obtained according to a state and location of a frame and a target delay, and when a difference therebetween exceeds a threshold, the adaptation control unit 231 may trigger an adaptation type and correct the playout delay and a depth of the delay buffer 130. For comfort noise for which an SID flag is active, a frame-based adaptation type is triggered such that frame-based adaptation may be performed by the de-jitter buffer 130. Meanwhile, for an active interval, a signal-based adaptation type is triggered such that time-based adaptation may be performed by the TSM application unit 150.

The playout delay reduction determination unit 233 may compare the playout delay estimated by the first playout delay estimation unit 211 and the playout delay estimated by the second playout delay estimation unit 213 and determine a playout delay reduction scheme in correspondence to the comparison result.

The playout delay reduction unit 235 may reduce a playout delay by using additional time shrinking or reducing a playout delay surplus based on the playout delay reduction scheme determined by the playout delay reduction determination unit 233.

Figure 3:
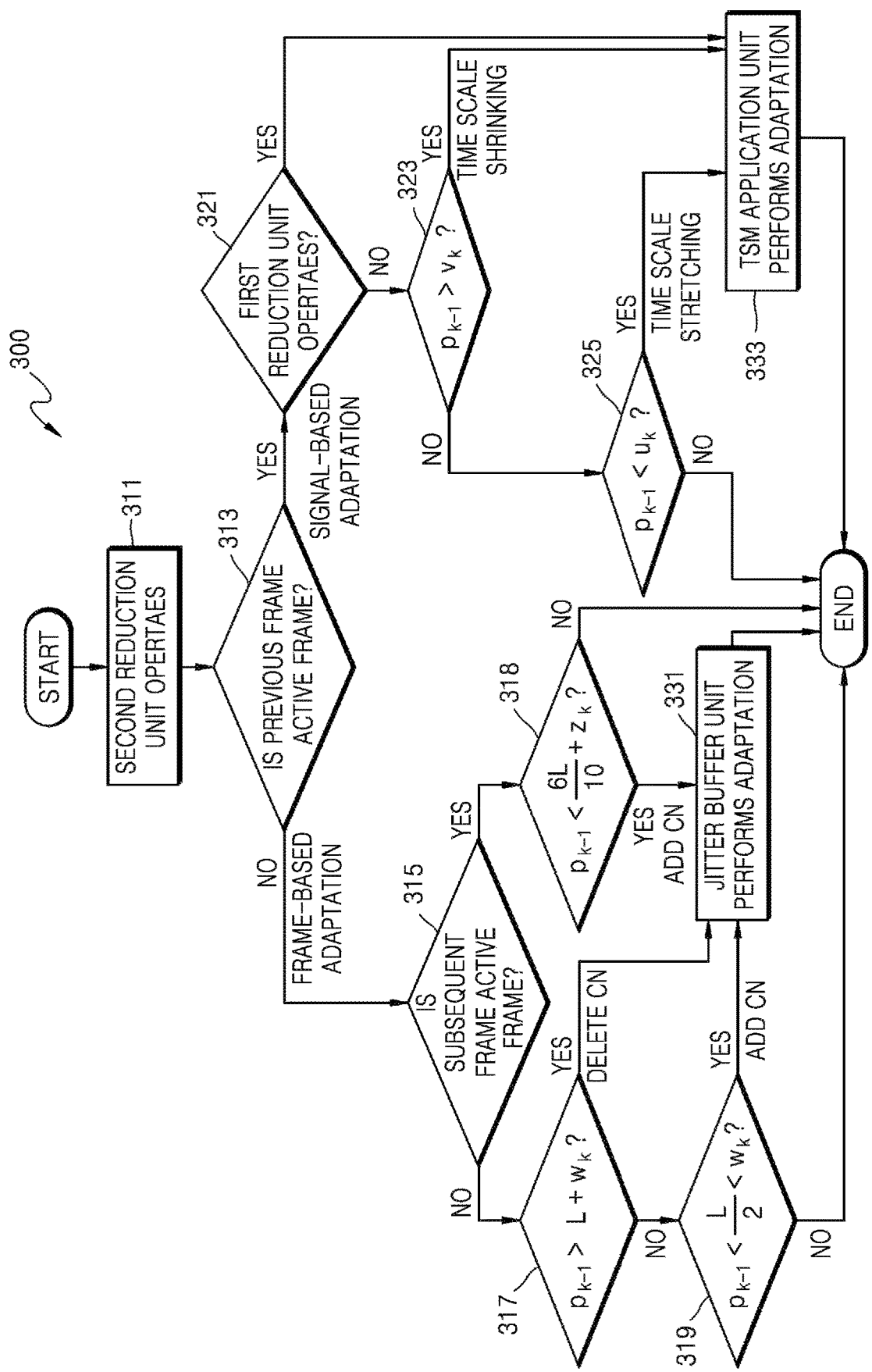
FIG. 3 is a flowchart for describing an operation of an adaptation control unit shown in FIG. 1.

FIG. 3 is a flowchart for describing an operation of the adaptation control unit shown in FIG. 1.

Referring to FIG. 3, a frame-based adaptation type and a signal-based adaptation type are identified according to a signal, and an adaptation type may be determined by comparing a target delay estimated by the target delay estimation unit 115 and a playout delay estimated by the playout delay estimation unit 119. A first reduction unit (operation 321) and a second reduction unit (operation 311) are newly added parts.

In FIG. 3, in operation 311, a playout delay surplus may be maintained or reduced based on a second reduction unit (530 of FIG. 5) to be described below. In detail, when a condition that an estimated playout delay can be reduced, i.e., Equation 17 below, is satisfied, or a minimum value in a buffer in which differences between target delays estimated by the target delay estimation 120 and playout delays estimated by the playout delay estimation unit 160 are stored is greater than a predetermined value, the playout delay surplus may be reduced. Otherwise, an initially set playout delay may be maintained.

In operation 313, it may be determined whether a previous frame is an active frame. If the previous frame is an active frame in operation 313, a signal-based adaptation type may be triggered, and if the previous frame is not an active frame, a frame-based adaptation type may be triggered.

In operation 315, it may be determined whether a subsequent frame is an active frame, if the previous frame is not an active frame as the determination result in operation 313.

In operations 317 and 319, an adaptation mode such as comfort noise (CN) deletion or addition may be determined and provided to a de-jitter buffer (130 of FIG. 1) according to a comparison result between $p_{k-1}$ and $w_k$, if the subsequent frame is not an active frame as the determination result in operation 315.

In operation 318, an adaptation mode such as CN addition may be determined and provided to the de-jitter buffer (130 of FIG. 1) according to a comparison result between $p_{k-1}$ and $z_k$, if the subsequent frame is an active frame as the determination result in operation 315.

In operation 331, the de-jitter buffer (130 of FIG. 1) deletes or adds comfort noise based on the adaptation mode determined according to the comparison result in operation 317, 318, or 319.

Meanwhile, in operation 321, it may be determined whether a condition that a first reduction unit (510 of FIG. 5) to be described below is performed is satisfied, if the previous frame is an active frame as the determination result in operation 313. In detail, when Equation 17 below is satisfied, and no packet loss has occurred in a predetermined number of previously arrived packets, for example, 1000 packets, it is determined that a network is stable, and an adaptation mode such as additional time shrinking may be determined and provided to a TSM application unit (170 of FIG. 1).

In operation 323, an adaptation mode such as time scale shrinking or stretching may be determined and provided to the TSM application unit 170 of FIG. 1) according to a comparison result between $p_{k-1}$ and $v_k$ or $u_k$, if an adaptation mode such as additional time scale shrinking is not determined as the determination result in operation 321.

In operation 333, the TSM application unit (170 of FIG. 1) may shrink or stretch a time scale based on the adaptation mode determined according to the determination result in operation 321 and the comparison results in operations 323 and 325.

Figure 4:
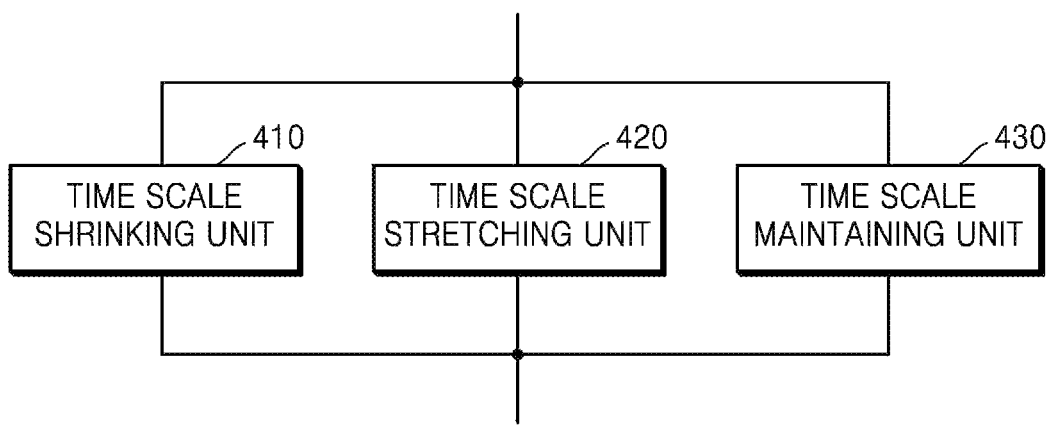
FIG. 4 shows an example in which a time adjustment factor according to whether to select adjustment is selectable.

FIG. 4 shows an example in which a time adjustment factor according to whether to select adjustment is selectable.

Referring to FIG. 4, a time scale shrinking unit 410 may operate according to the determination result in operation 321 or the comparison result in operation 323 in FIG. 3. That is, when Equation 17 below is satisfied, and no packet loss has occurred in a predetermined number of previously arrived packets, for example, 1000 packets, a time scale may be shrunk. In other words, when $p_{k-1}$ is greater than $v_k$, a time scale may be shrunk.

Figure 5:
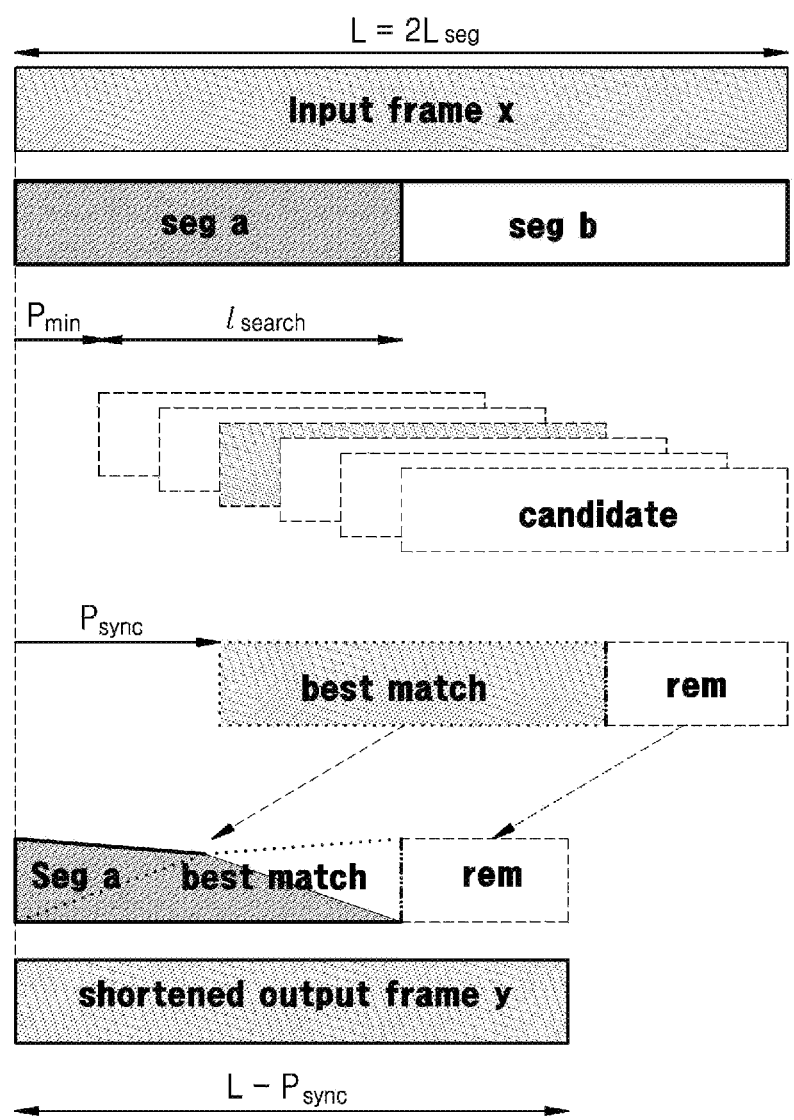
FIG. 5 illustrates time scale shrinking processing.

Hereinafter, time scale shrinking processing according to an embodiment will be described in detail with reference to FIG. 5.

The time scale shrinking processing is to shrink a frame size L to $L_{out}$. $L_{out}$ may differ from L by, for example, 2.5 to 10 ms, and as a result, a frame interval may be 10 to 17.5 ms. A time scaling amount may vary depending on a location of an optimal matching candidate segment (hereinafter, referred to as an optimal location) having the highest similarity to a first segment of an input signal. A search start location and a search end location to be used to search for a candidate segment from an input frame for time scale shrinking may vary depending on a sampling frequency. An output frame according to the time scale shrinking may be obtained through cross fade of a first segment of an input frame and an optimal matching candidate segment. In this case, the output frame is shifted by an optimal location $P_{sync}$, and a size thereof is $L-P_{sync}$. Samples after the optimal matching candidate segment may be added to a merged signal such that continuity with subsequent frames is maintained. According to an embodiment, since a lookahead sample is not required during the time scale shrinking processing, a surplus delay is not caused, but a spare buffer may be required to generate a fixed-length output frame from a variable-length output frame.

A time scale stretching unit 430 may operate depending on the comparison result in operation 325 in FIG. 3. That is, when $p_{k-1}$ is less than $u_k$, a time scale may be stretched.

Figure 6:
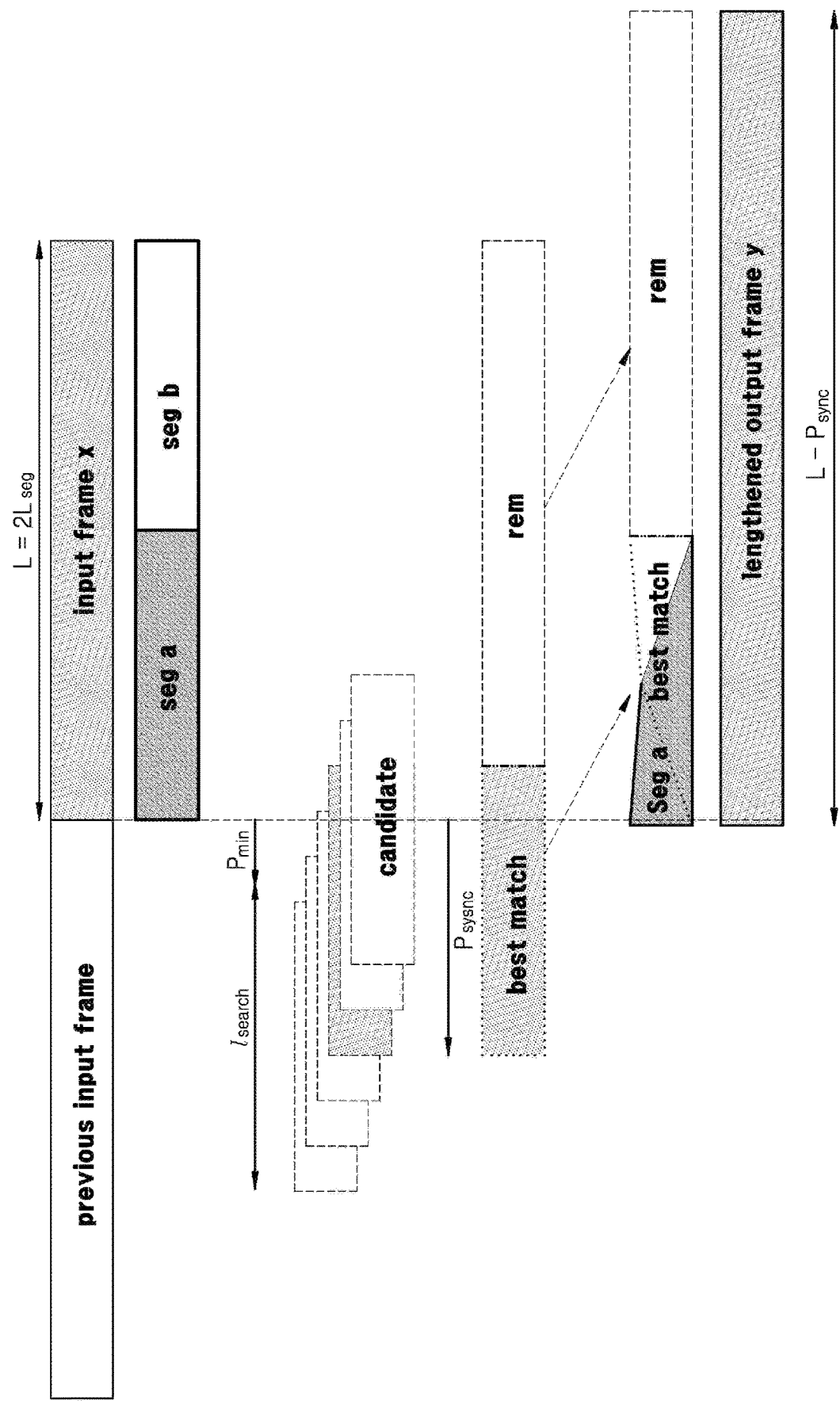
FIG. 6 illustrates time scale stretching processing.

Hereinafter, time scale stretching processing according to an embodiment will be described in detail with reference to FIG. 6.

The time scale stretching processing is to stretch the frame size L to $L_{out}$. $L_{out}$ may differ from L by, for example, 2.5 to 15 ms, and as a result, a frame interval may be 22.5 to 35 ms. A time scaling amount may vary depending on a location of an optimal matching candidate segment (hereinafter, referred to as an optimal location) having the highest similarity to a first segment of an input signal. A search start location and a search end location to be used to search for a candidate segment from an input frame for time scale stretching may vary depending on a sampling frequency. An output frame according to the time scale stretching may be obtained through cross fade of a first segment of an input frame and an optimal matching candidate segment. In this case, the output frame is shifted by an optimal location $P_{sync}$, and a size thereof is $L-P_{sync}$. Herein, $P_{sync}$ has a negative value based on the start location and the end location. Samples after the optimal matching candidate segment may be added to a merged signal such that continuity with subsequent frames is maintained. According to an embodiment, a lookahead sample is not required during the time scale stretching processing, but a previous frame is required. Therefore, a surplus delay is not caused, but a spare buffer may be required to generate a fixed-length output frame from a variable-length output frame.

A time scale maintaining unit 450 may operate depending on the comparison result in operation 325 in FIG. 3. That is, when $p_{k-1}$ is greater than or equal to $u_k$, a time scale may be maintained as it is.

Figure 7:
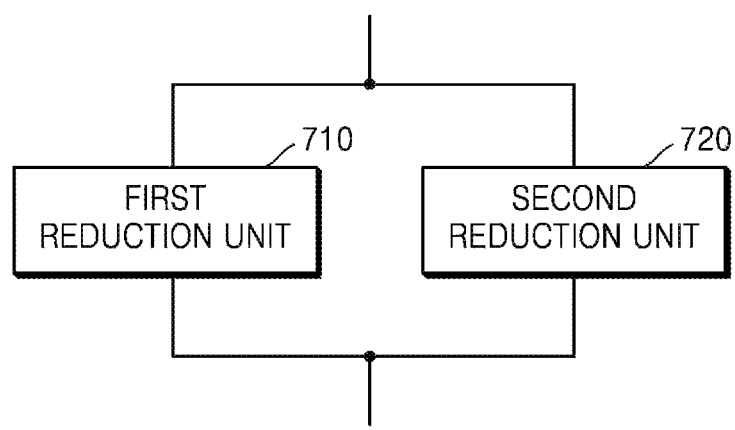
FIG. 7 is a block diagram illustrating an additional playout delay reduction scheme when playout delay reduction by E-model is determined.

FIG. 7 illustrates a playout delay reduction scheme when playout delay reduction by E-model is determined.

In FIG. 7, a first reduction unit 710 may reduce a playout delay by using additional time scale shrinking. First, the first reduction unit 710 may check a condition that an estimated playout delay can be reduced, by comparing the playout delay estimated by the first playout delay estimation unit 211 and the playout delay estimated by the second playout delay estimation unit 213 by Equation 17 below.

$$p_{k-1}^{EVS} > p_k^{E\text{-}model} + 25 \quad (17)$$

Meanwhile, a difference value between the two playout delays may be stored in a buffer having a capacity of 200 entries.

When Equation 17 above is satisfied, and no packet loss has occurred in a predetermined number of previously arrived packets, for example, 1000 packets, it is determined that a network is stable, and a playout delay may be reduced by using additional time shrinking.

A second reduction unit 730 may reduce a playout delay by reducing a playout delay surplus. The second reduction unit 730 may reduce the playout delay surplus initially set to a first predetermined value, e.g., 60, to a second predetermined value, e.g., 40, when the condition of the first reduction unit 710 is satisfied. In addition, when a minimum value in a buffer in which difference values of $p_{k-1}^{EVS}$ and $p_k^{E\text{-}model}$ are stored is greater than a third predetermined value, e.g., 20, the playout delay surplus may be reduced to a fourth predetermined value, e.g., 20.

Figure 8:
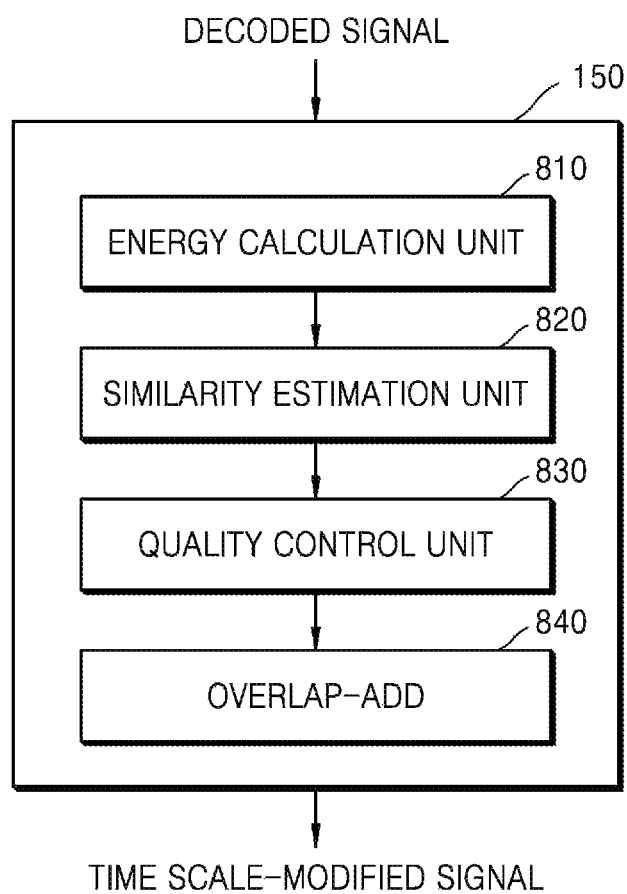
FIG. 8 is a block diagram of a time scale modification (TSM) apparatus according to an embodiment.

FIG. 8 is a block diagram of a TSM apparatus according to an embodiment.

The apparatus shown in FIG. 8 may include an energy calculation unit 810, a similarity estimation unit 820, a quality control unit 830, and an overlap-add unit 840.

Referring to FIG. 8, the energy calculation unit 810 may calculate energy of a decoded signal. In detail, the energy calculation unit 810 may analyze an input signal including a previous frame, in units of sub-segments, for example, in units of 1 ms. When energy of all sub-segments to be merged is a threshold or less, a frame may be scaled at most. The threshold may be, for example, −65 dB but is not limited thereto. For time scale shrinking, a shift value s may be set to a search end location in correspondence to each sampling frequency such that a 20-ms frame is shrunk to a 10-ms frame. For time scale stretching, the shift value s may be set to a search start location in correspondence to each sampling frequency such that a 20-ms frame is stretched to a 35-ms frame. An output frame may be obtained by cross fade of a first segment and an s-shifted segment of an input frame.

The similarity estimation unit 820 may determine an optimal location for TSM by using a correlation obtained based on the energy calculated by the energy calculation unit 810.

The quality control unit 830 may prevent the occurrence of distortion of a TSM signal with respect to the optimal location. In detail, after the similarity estimation unit 820 estimates similarity, a quality measure q may be calculated. The quality measure q may be obtained by using a normalized cross correlation. The quality measure q may be used to determine whether TSM is performed.

The overlap-add unit 840 may perform TSM with respect to the optimal location. The overlap-add unit 840 may generate an output frame scaled by time scale shrinking processing or time scale stretching processing.

Figure 9:
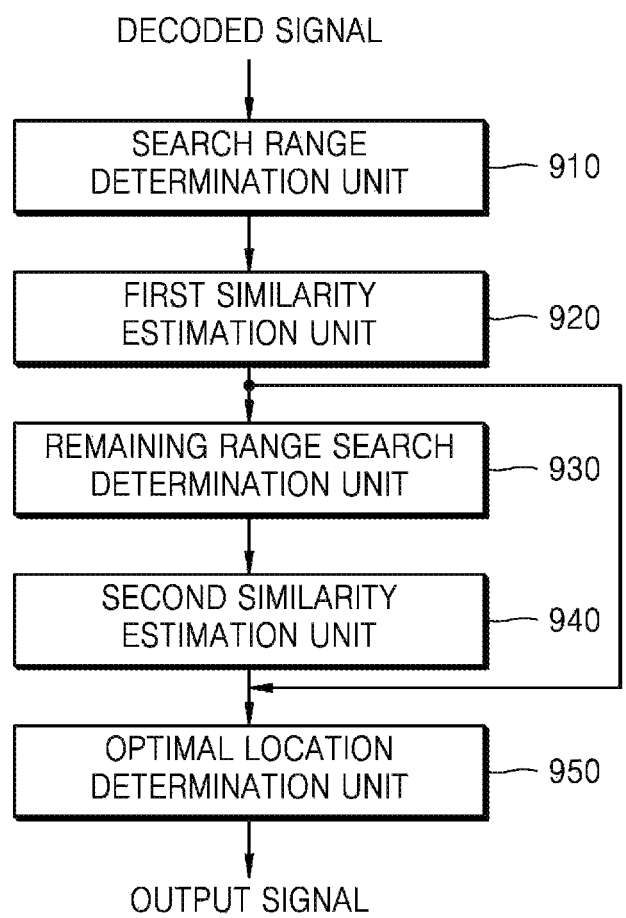
FIG. 9 is a block diagram of a similarity estimation unit shown in FIG. 8.

FIG. 9 is a block diagram of the similarity estimation unit shown in FIG. 8.

The similarity estimation unit shown in FIG. 9 may include a search range determination unit 910, a first similarity estimation unit 920, a remaining range search determination unit 930, a second similarity estimation unit 940, and an optimal location determination unit 950.

Referring to FIG. 9, the search range determination unit 910 may determine a search range reduced by a predetermined percentage, e.g., 50%, to first search for an optimal location determined in a previous frame.

The first similarity estimation unit 920 may search for an optimal location having the maximum similarity by estimating similarity within the determined search range.

The remaining range search determination unit 930 obtains a normalized similarity $C_\tau$ by applying Equation 18 below to the optimal location determined by the first similarity estimation unit 920.

$$C_\tau = \frac{\sum_{n=0}^{L_{seg}} x(n)x(n+\tau)}{\sqrt{\sum_{n=0}^{L_{seg}} x^2(n) \cdot \sum_{n=0}^{L_{seg}} x^2(n+\tau)}} \quad (18)$$

Herein, $\tau$ denotes the optimal location determined by the first similarity estimation unit 920. When $C_\tau$ is greater than a threshold, the optimal location search ends, otherwise it is determined that the optimal location search is performed with respect to the remaining range.

The second similarity estimation unit 940 may search for an optimal location having the maximum similarity within the remaining range again.

The optimal location determination unit 950 may select, as a final optimal location, an optimal location having a higher similarity between the optimal location determined by the first similarity estimation unit 920 and the optimal location determined by the second similarity estimation unit 940. Time scale shrinking or stretching may be performed based on the final optimal location.

Figure 10:
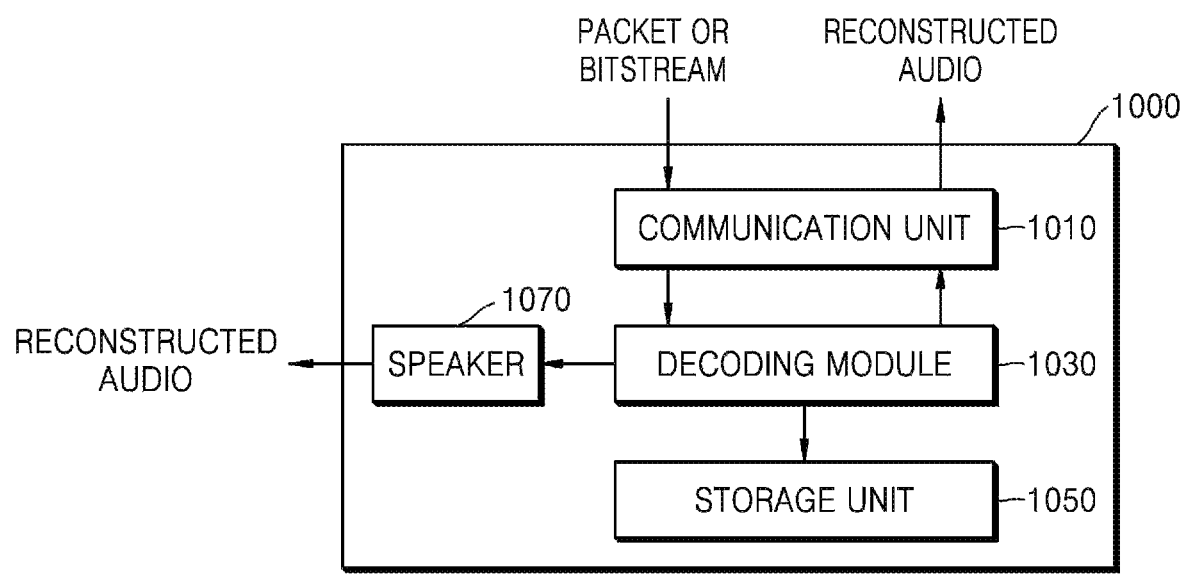
FIG. 10 is a block diagram of a multimedia device according to an embodiment.

FIG. 10 is a block diagram of a multimedia device according to an embodiment.

A multimedia device 1000 shown in FIG. 10 may include a communication unit 1010 and a decoding module 1030. In addition, a storage unit 1050 for storing a reconstructed audio signal obtained as a decoding result may be further included depending on the usage of the reconstructed audio signal. In addition, the multimedia device 1000 may further include a speaker 1070. That is, the storage unit 1050 and the speaker 1070 may be optionally included. Herein, the decoding module 1030 may be integrated with another component (not shown) included in the multimedia device 1000 to implement one or more processors (not shown).

Referring to FIG. 10, the communication unit 1010 may receive at least one of an encoded bitstream and an audio signal provided from the outside, or transmit at least one of a reconstructed audio signal obtained as a decoding result of the decoding module 1030 and an audio bitstream obtained by an encoding result.

The communication unit 1010 is configured to be able to transmit and receive data to and from an external multimedia device or a server through a wireless network such as wireless Internet, wireless intranet, wireless telephone network, wireless local area network (LAN), Wi-Fi, Wi-Fi Direct (WFD), third generation (3G), 4G, Bluetooth, infrared data association (IrDA), radio frequency identification (RFID), ultra wideband (UWB), Zigbee, or near-field communication (NFC) or a wired network such as wired telephone network or wired Internet.

The decoding module 1030 may receive a packet or bitstream provided through the communication unit 1010 and perform playout delay adjustment processing or TSM processing according to the embodiments described above when decoding is performed. Herein, according to an embodiment, the playout delay adjustment processing may include adjusting a playout delay surplus based on a difference value between a first playout delay obtained in a first scheme and a second playout delay obtained in a second scheme, determining an adaptation type of a current frame according to whether a previous frame is an active frame, and when the determined adaptation type is signal-based adaptation, performing TSM according to an adaptation scheme determined according to a comparison result between the first playout delay and the second playout delay and a comparison result between a target delay and the first playout delay. Meanwhile, according to an embodiment, the TSM processing may include determining a reduced search range for the current frame based on an optimal location of a past frame, determining whether a range remaining by excluding the reduced search range is to be searched, estimating similarity with respect to the reduced search range and the remaining range, searching for optimal locations having the maximum similarity, determining, as a final optimal location, one of the optimal location retrieved in the reduced search range and the optimal location retrieved in the remaining range, and performing time scale shrinking or stretching based on the final optimal location.

The storage unit 1050 may store the reconstructed audio signal generated by the decoding module 1030. Meanwhile, the storage unit 1050 may store various programs required to operate the multimedia device 1000.

The speaker 1070 may output the reconstructed audio signal generated by the decoding module 4230 to the outside.

Figure 11:
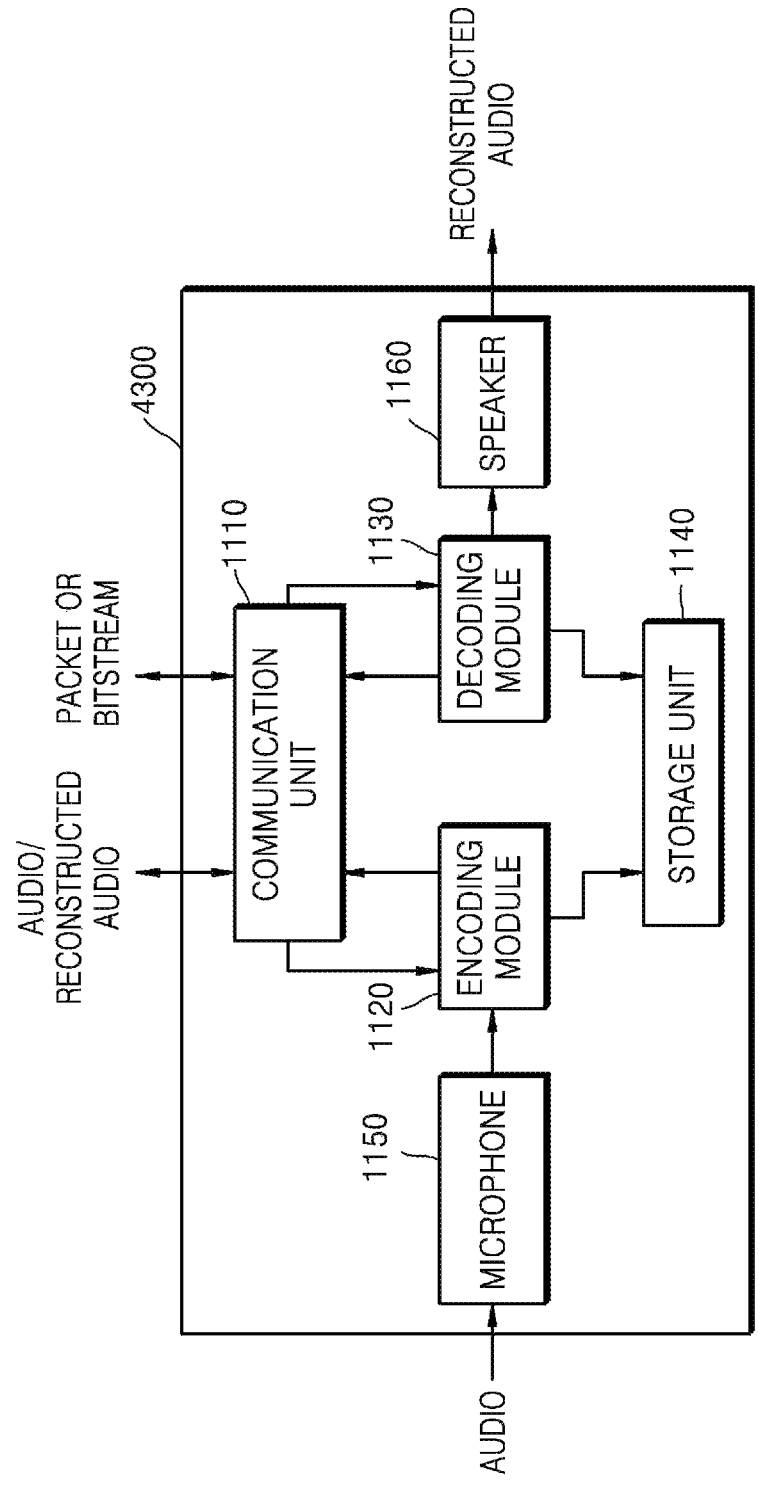
FIG. 11 is a block diagram of a multimedia device according to another embodiment.

FIG. 11 is a block diagram of a multimedia device according to another embodiment.

A multimedia device 1100 shown in FIG. 11 may include a communication unit 1110, an encoding module 1120, and a decoding module 1130. In addition, a storage unit 1140 for storing an audio bitstream obtained as an encoding result or a reconstructed audio signal obtained as a decoding result may be further included depending on the usage of the audio bitstream or the reconstructed audio signal. In addition, the multimedia device 1100 may further include a microphone 1150 or a speaker 1060. Herein, the encoding module 1120 and the decoding module 1130 may be integrated with another component (not shown) included in the multimedia device 1100 to implement one or more processors (not shown). Some of the components shown in FIG. 11 correspond to the components in the multimedia device 1000 shown in FIG. 10, and thus a detailed description thereof is omitted.

The communication unit 1110 may receive at least one of audio and an encoded bitstream provided from the outside or transmit at least one of reconstructed audio and an audio bitstream obtained by an encoding result of the encoding module 1120.

The encoding module 1120 may generate a bitstream or packet by embedding various codes therein to encode an audio or speech signal.

The decoding module 1130 may be implemented in correspondence to or independently from the encoding module 1120. The decoding module 1130 may receive a packet or bitstream provided through the communication unit 1110 and apply playout delay adjustment processing or TSM processing according to the embodiments described above when decoding is performed.

The storage unit 1140 may store various programs required to operate the multimedia device 1100.

The microphone 1150 may provide an audio signal of a user or the outside to the encoding module 1120.

The multimedia devices 1000 and 1100 shown in FIGS. 10 and 11 may include a voice communication exclusive terminal including a telephone, a mobile phone, or the like, a broadcast or music exclusive terminal including a television (TV), an MP3 player, or the like, a fusion terminal device of the voice communication exclusive terminal and the broadcast or music exclusive terminal, or a user terminal of a teleconferencing or interaction system but are not limited thereto. In addition, the multimedia device 1000 or 1100 may be used as a client, a server, or a transducer disposed between a client and a server.

Meanwhile, when the multimedia device 1000 or 1100 is, for example, a mobile phone, although not shown, a user input unit such as a keypad, a display unit for displaying a user interface or information processed by the mobile phone, and a processor for controlling the general function of the mobile phone may be further included. In addition, the mobile phone may further include a camera unit having an image capturing function and at least one component for performing functions required in the mobile phone.

Meanwhile, when the multimedia device 1000 or 1100 is, for example, a TV, although not shown, a user input unit such as a keypad, a display unit for displaying received broadcast information, and a processor for controlling the general function of the TV may be further included. In addition, the TV may further include at least one component for performing functions required in the TV.

The above-described embodiments can be written as computer-executable programs and can be implemented in general-use digital computers that execute the programs using a computer-readable recording medium. In addition, a data structure, program instructions, or a data file to be usable in the above-described embodiments of the present disclosure may be recorded on a computer-readable recording medium through various means. The computer-readable recording medium may include all types of storage devices in which computer system-readable data is stored. Examples of the computer-readable recording medium may include magnetic media such as hard discs, floppy discs, and magnetic tapes, optical recording media such as compact disc-read only memories (CD-ROMs) and digital versatile discs (DVDs), magneto-optical media such as floptical discs, and hardware devices that are specially configured to store and carry out program commands, such as ROMs, RAMs, and flash memories. Alternatively, the computer-readable recording medium may be a transmission medium through which a signal designating program commands, a data structure, or the like are transmitted. Examples of the program commands may include a high-level language code that may be executed by a computer using an interpreter as well as a machine language code made by a complier.

While one embodiment of the present disclosure has been described with reference to limited embodiments and drawings, the one embodiment of the present disclosure is not limited to the described embodiments and those of ordinary skill in the art to which the present disclosure belongs may attempt various modifications and changes from the disclosure. Therefore, the scope of the present disclosure is defined not by the above description but by the appended claims, and all the scopes equivalent to the claims or equivalently changed from the claims will belong to the category of the technical idea of the present disclosure.

The invention claimed is:

1. A playout delay adjustment method comprising:
   adjusting a playout delay surplus based on a difference value between a first playout delay obtained in a first scheme and a second playout delay obtained in a second scheme, and determining an adaptation type of a current frame according to whether a previous frame is an active frame; and
   when the determined adaptation type is signal-based adaptation, performing time scale modification (TSM) according to an adaptation scheme determined according to a comparison result between the first playout delay and the second playout delay and a comparison result between a target delay and the first playout delay,
   wherein the performing of the TSM comprises:
   determining a first search range reduced from an original search range for a current frame, wherein the first search range corresponds to a location of a matching candidate segment determined in a previous frame;
   searching for a first matching candidate segment within the first search range by estimating similarity;
   determining whether to search within a second search range which is a remaining range except for the first search range from the original search range, based on a similarity of the first matching candidate segment;
   searching for a second matching candidate segment within the second range by estimating similarity;
   determining, as a final location of a matching candidate segment, a location having a higher similarity between a location of the first matching candidate segment and a location of the second matching candidate segment; and
   performing time scale shrinking or stretching based on the final location.

2. The playout delay adjustment method of claim 1, wherein the first scheme is based on an enhanced voice service (EVS) codec.

3. The playout delay adjustment method of claim 1, wherein the second scheme is based on an E-model.

4. The playout delay adjustment method of claim 1, wherein the performing of the TSM comprises:
   when a difference between the first playout delay and the second playout delay is greater than a threshold, determining time scale shrinking as the adaptation scheme; and
   when the difference between the first playout delay and the second playout delay is less than the threshold, determining time scale stretching or shrinking as the adaptation scheme based on a difference between the target delay and the first playout delay.

5. A non-transitory computer-readable recording medium having recorded thereon a program capable of executing the playout delay adjustment method of claim 1.

6. A playout delay adjustment apparatus comprising:
   at least one processor; and
   a memory storing a program executable by the at least one processor,
   wherein the at least one processor is configured to:
   adjust a playout delay surplus based on a difference value between a first playout delay obtained in a first scheme and a second playout delay obtained in a second scheme and determine an adaptation type of a current frame according to whether a previous frame is an active frame;
   store frames to be decoded, and perform adaptation on the stored frames when the determined adaptation type is frame-based adaptation;
   decode a frame provided from the jitter buffer; and
   perform adaptation on the decoded frame when the determined adaptation type is time-based adaptation,
   wherein the at least one processor is further configured to:
   determine a first search range reduced from an original search range for a current frame, wherein the first search range corresponds to a location of a matching candidate segment determined in a previous frame;
   search for a first matching candidate segment within the first search range by estimating similarity;
   determine whether to search within a second search range which is a remaining range except for the first search range from the original search range, based on a similarity of the first matching candidate segment;
   search for a second matching candidate segment within the second range by estimating similarity;
   determine, as a final location of a matching candidate segment, a location having a higher similarity between a location of the first matching candidate segment and a location of the second matching candidate segment; and
   perform time scale shrinking or stretching based on the final location.

* * * * *